United States Patent [19]

Everaerts et al.

[11] Patent Number: 5,817,376
[45] Date of Patent: *Oct. 6, 1998

[54] FREE-RADICALLY POLYMERIZABLE COMPOSITIONS CAPABLE OF BEING COATED BY ELECTROSTATIC ASSISTANCE

[75] Inventors: Albert I. Everaerts, Oakdale; William M. Lamanna, Stillwater; Albert E. Seaver, Woodbury; George V. Tiers, St. Paul, all of Minn.

[73] Assignee: Minnesota Mining and Manufacturing Company, St. Paul, Minn.

[*] Notice: The term of this patent shall not extend beyond the expiration date of Pat. No. 5,554,644.

[21] Appl. No.: 622,103

[22] Filed: Mar. 26, 1996

[51] Int. Cl.$^6$ .............................. C08F 2/50; B05D 1/04; C09J 7/02

[52] U.S. Cl. ..................... 427/483; 428/483; 428/515; 428/451; 428/426; 428/473.5; 428/461; 428/537.5; 428/492; 526/173; 526/183; 526/196; 526/184; 526/220; 526/217; 526/222; 526/225; 528/26; 522/14; 522/15; 522/16; 522/17; 522/96; 522/99; 522/181; 522/182

[58] Field of Search ................................ 522/99, 15, 181, 522/148, 182, 96, 14, 16, 17; 526/173, 183, 184, 196, 217, 220, 222, 225; 528/26; 427/483; 428/426, 451, 483, 515, 473.5, 461, 537.5, 492

[56] References Cited

U.S. PATENT DOCUMENTS

| | | | |
|---|---|---|---|
| 3,348,965 | 10/1967 | Drum | 117/93.4 |
| 4,059,444 | 11/1977 | Lu et al. | 96/1 |
| 4,097,417 | 6/1978 | Pastor et al. | 252/501 |
| 4,303,924 | 12/1981 | Young, Jr. | 346/1.1 |
| 4,486,504 | 12/1984 | Chung | 428/412 |
| 4,748,043 | 5/1988 | Seaver et al. | 427/30 |
| 5,326,598 | 7/1994 | Seaver et al. | 427/473 |
| 5,364,726 | 11/1994 | Morrison et al. | 430/115 |
| 5,372,682 | 12/1994 | Devore et al. | 556/17 |
| 5,397,673 | 3/1995 | Watson et al. | 430/126 |
| 5,425,991 | 6/1995 | Lu | 428/352 |
| 5,554,664 | 9/1996 | Lamanna et al. | 522/25 |

FOREIGN PATENT DOCUMENTS

| | | | |
|---|---|---|---|
| 0 461 320 | 12/1991 | European Pat. Off. | C09D 4/00 |
| 583259 | 1/1996 | European Pat. Off. | |
| 2 170 215 | 9/1973 | France | C09D 7/12 |
| WO 94/07612 | 4/1994 | WIPO | B05D 1/04 |
| WO94/07965 | 4/1994 | WIPO | |
| WO 95/03338 | 2/1995 | WIPO | C08F 4/00 |

OTHER PUBLICATIONS

ASTM D 5403–93, Standard Test Methods for Volatile Content of Radiation Curable Materials, 1993.

*Primary Examiner*—Susan W. Berman
*Attorney, Agent, or Firm*—Lisa M. Fagan

[57] ABSTRACT

Compositions containing conductivity enhancers, which are capable of being coated onto a substrate by means of electrostatic assistance. The compositions comprise one or more free-radically curable monomer(s), and one or more non-volatile conductivity enhancer(s), having cationic and anionic portions, which are soluble in the monomer(s) and which do not interfere with free-radical polymerization, wherein said anionic portion is a non-coordinating organophilic carbon-containing anion. The compositions may further comprise one or more initiator(s), one or more dissociation enhancing agent(s), cross-linking agent(s), cationically polymerizable monomer(s), cationic initiator(s), leveling agents, oligomer(s) or polymer(s), preferably co-reactive, and other additives or adjuvants to impart specific properties to the cured coating.

44 Claims, No Drawings

FREE-RADICALLY POLYMERIZABLE COMPOSITIONS CAPABLE OF BEING COATED BY ELECTROSTATIC ASSISTANCE

FIELD OF THE INVENTION

This invention relates to compositions capable of being coated onto a substrate by means of electrostatic assistance. More particularly, the present invention relates to free-radically polymerizable compositions containing conductivity enhancers, substrates coated with these compositions, and methods for coating the substrates.

BACKGROUND OF INVENTION

The release of chemicals into the atmosphere, often polluting the air, is of substantial concern. Thus, in the chemical industry as new products and processes are developed, a key factor is the environmental effect. One means of reducing chemical emissions is to develop solvent-free processes, and to require that chemicals do not evaporate during processing or from the final product.

Liquid coatings traditionally have been solvent-based processes. Liquid coating is the process of replacing the gas, typically air, contacting a substrate, usually a solid surface such as a film or web, with a layer of liquid. After the deposition of a coating, it may remain a liquid, it may be dried if it contains solids dissolved in a volatile liquid, leaving behind a solid and typically adherent layer, or it may be "cured" (i.e., polymerized) or in some other way solidified to a functional and typically adherent layer. Volatile solvents typically have been used during coating processes and then evaporated off leaving the desired composition, especially when thin coatings are desired.

The coating process typically is selected based on the desired coat height (i.e., the coating thickness). Continuous liquid coating techniques (such as roll, curtain, slot, slide, gravure, and the like and combinations thereof) are commonly preferred for applying a composition onto a smooth substrate to a height of about 5 micrometers or more. See generally, Modern Coating and Drying Technology, E. Cohen and E. Gutoff, VCH Publishing, N.Y., 1992. Rough or "three-dimensional" surfaces are preferably coated by spray processes.

Traditionally, solvent-borne thin coatings, i.e., dry thickness below about 5 micrometers, have been coated onto substrates for use as a release coating, a primer, or an anti-static layer, while thicker coatings have been used for adhesives, or for the manufacture of coated abrasives, etc. Continuous liquid coating techniques may be used to apply thin coatings; however, the composition typically has been diluted with a large amount of a solvent that is later removed by evaporation, leaving behind the composition at the desired thickness. The uniformity and thickness of the dried final layer may be difficult to control especially on rough surfaces. The added solvent leads to higher material costs, preparation costs, and solvent removal costs. In addition, the solvents typically used may be hazardous to the environment.

For continuous liquid coating processes as the line speed of the coating is increased, the process can become unstable allowing air entrapment to occur at the region where the composition first meets the substrate. This region is usually referred to as the "coating bead." Fortunately, electrostatic assistance may be used to alleviate the air entrapment problem occurring between the coating bead and the substrate. However, not all compositions can be applied by electrostatic assistance methods. The composition must have a sufficient conductivity such that free ions can move within the composition when an electric field is applied. Then as a high differential of electrical potential is applied between the composition and the substrate, an electric field is produced in the composition which induces the ions of one polarity in the composition to move to the coating bead surface which is closest to the substrate. In some coaters (e.g., gravure) which do not have a single coating bead, the ions still move to the composition's surfaces (e.g., the composition's surfaces in the gravure cells) which are closest to the substrate. This "inductive charging" of the composition causes an electrostatic pressure at the coating bead surface which can change the shape of the coating bead and prevent air from coming between the coating bead and the substrate. Thus with electrostatic assistance, increased line speeds may be obtained while maintaining uniformity when performing continuous coating. Even with discrete gravure coating methods, electrostatic assistance allows for increased line speeds because the electrostatic pressure "pulls" the composition out of the gravure cells.

Solvent-borne thin coatings may also be applied by spray processes. Although spray coating may be used to apply a composition to a smooth substrate, it is particularly useful as a method of coating rough or three-dimensional objects and sheet-like webs with rough or three-dimensional surfaces. Electrostatic spray processes are commonly preferred for applying a composition having a solvent to a rough surface to a coat height of 5 micrometers or more. However, a problem associated with spray processes is over-spraying (i.e., 50 to 80 percent of the composition may not reach the substrate). (Miller, E. P., Chapter 11, Electrostatic Coating; in Electrostatics and Its Applications, Wiley-Interscience (1973) Editor: A. D. Moore). Electrostatic spray processes provide a more controlled means of spraying, and thus reduce material loss.

In the more efficient electrostatic spray processes, the droplets are charged during formation using inductive-charging. Inductive-charging places a charge on the droplets through the electric field within the composition at the sprayer by which the electric field moves the positive free ions in opposite direction to the negative free ions. The excess of one polarity of ions accumulates at a region along the composition surface and creates the electrostatic pressure required to break the composition into a charged droplet mist. To achieve this inductive charging, the composition must have sufficient conductivity to ensure a reasonable number of free ions are present. Droplets in electrostatic spray coating typically range in diameter from about 50 micrometers (μm) to about 200 μm, whereas conventional (non-electrostatic) spray processes can have droplets as large as 500 μm.

Electrospray, a distinct sub-class within electrostatic spraying, is restricted to low flow rates, which makes it useful for applying coatings to a thickness from about 0.005 micrometers to about 10 micrometers. Electrospray may be used to apply a thin coating without a solvent. In an electrospray process, the electrostatic pressure on the composition surface at the sprayhead causes a precisely controlled formation of one or more cones of composition from which a fine filament of liquid emanates. Each filament breaks up into a mist of droplets with droplet diameters on the order of the diameter of the filament. The diameter of the droplet can be controlled by the conductivity of the coating solution. Droplet diameters are typically less than 50 μm, and can be less than 1 μm if the conductivity is sufficiently large.

Although the electrospray process is an effective means of applying a thin coating, not every composition can be electrosprayed. As is the case with all electrostatic assistance methods, the composition must meet certain processing requirements. The viscosity and conductivity requirements for the composition to be coated vary with the electrostatic assistance method and with the coating thickness desired. For electrospray, the composition must be essentially either a single phase solution or a non-ionically-stabilized dispersion or emulsion, otherwise the composition may become unstable during the electrospray process. In a single phase solution ("true solution"), each component is completely soluble.

Compositions can be electrosprayed with or without a solvent, provided the composition is either a single phase solution or a non-ionically-stabilized emulsion or dispersion. Often a solvent must also be added to the composition in order to obtain the requisite component solubility. This added solvent, particularly if organic, may present environmental problems if it evaporates during or after processing and is not captured.

When a composition is truly solvent-free, substantially all of the initial components are present in some form in the final cured product. Thin coatings exist which are solvent-cast, but do not fit this definition because the solvent evaporates off during processing. For example, although ethanol or methanol can be added to electrosprayable compositions to enhance solubility and conductivity, they evaporate during processing. For some free-radical-curing systems, such solvents may interfere with polymerization by serving as chain transfer agents or as inhibitors, and preferably they are removed prior to curing.

Water-based compositions, although sometimes termed "solvent-free," typically require large drying ovens, which occupy a sizable portion of manufacturing space and add to the product cost. In addition, often compositions to be electrosprayed are organic, and thus tend to be immiscible with water.

A solvent can be added to a composition to enhance conductivity. To achieve the desired conductivity range, compositions often contain a polar solvent typically considered to be a volatile organic compound ("VOC"), in addition to a conductivity enhancer, i.e., salt. These volatile organic compounds can be hazardous to the environment.

For electrospray, solvents have been used to increase solution conductivity. For example, EPO Appln. No. 92.907947.3 (Mazurek et al.) discloses adding methanol in small quantities to enhance the conductivity of an electrosprayable release coating. However, methanol evaporates during processing, otherwise it may interfere with free-radical polymerization.

U.S. Pat. No. 4,059,444 discloses adding quaternary ammonium salts which have inorganic anions with relatively low molecular weights as conductivity enhancers, such as sulfate, borate, and iodide, to ink. These conductivity control agents are added at levels of 0.05 to about 1 weight percent to increase the conductivity of electrostatically applied inks.

U.S. Pat. No. 5,364,726 discloses a liquid developer comprising a colorant and a curable liquid vehicle, solid particles containing an initiator which is substantially insoluble, and optionally conductivity enhancing agents such as quaternary ammonium compounds as described in U.S. Pat. No. 4,059,444.

U.S. Pat. No. 4,097,417 discloses a photocurable electroconductive coating having preferably 20 to 50 weight percent copolymerizable organic salts applied to a substrate by means of any continuous liquid coating technique such as air knife, reverse roll, gravure, etc.

U.S. Pat. No. 4,303,924 discloses adding an oil-soluble salt, such as the mineral acid and organic acid quaternary salts of the Group Va elements, to a curable printing ink containing 0 to 30% of a polar organic solvent. All examples include a polar organic solvent.

To electrospray a thin layer having uniform thickness, each droplet from the electrospray mist must have a sufficiently low viscosity to allow for reasonable spreading on the substrate. However, for some applications, it may be desirable to cure individual droplets on the substrate, e.g., slip sheets. Solvents and reactive diluents have been added to control viscosity. For example, reactive diluents are disclosed in WO95/23694 (Kidon et al.) and U.S. Pat. No. 4,201,808 (Cully et al.).

Regardless of the method of applying a coating to a substrate, the components preferably do not detrimentally interfere with the final performance of the product. A component preferably evaporates or does not interfere with polymerization or becomes physically trapped in the coating during processing, otherwise the component may migrate into the substrate and detrimentally affect the product's performance. Alternatively, it may later evaporate polluting the environment, or may later contact another surface, rub off, and contaminate that surface. To utilize the advantages electrostatic assistance methods offer, the compositions must have sufficient conductivity. Thus, the need exists for coating compositions capable of being applied by electrostatic assistance (i.e., electrostatically assisted continuous liquid coating (roll, curtain, slot, slide, gravure, and the like), electrostatic spray coating, or electrospray coating) where substantially all of the components are present in the final product and either co-polymerize with the other components or otherwise become a permanent part of the coating.

SUMMARY OF THE INVENTION

We have found compositions that are capable of being applied to a substrate by means of electrostatic assistance, the components of which do not interfere with polymerization, and when placed upon a substrate and substantially polymerized, the compositions do not undesirably degrade the properties of the product.

By incorporating conductivity enhancers in accordance with the invention, a composition which was insufficiently conductive for coating via electrostatic assistance may be formulated to achieve the desired conductivity. In addition to achieving adequate conductivity, the conductivity enhancers must be soluble in the composition, not adversely affect the composition's viscosity, preferably either substantially co-polymerize or become a permanent part in the final composition, and not undesirably degrade the final product. Non-volatile salts having non-coordinating carbon-containing anions satisfy these requirements.

The present invention provides compositions containing conductivity enhancers which are capable of being coated onto a substrate by means of electrostatic assistance. The compositions comprise one or more free-radically polymerizable monomer(s) and one or more non-volatile conductivity enhancer(s) having cationic and anionic portions which are soluble in the monomer(s) and which do not interfere with free-radical polymerization, wherein the anionic portion is a non-coordinating carbon-containing anion. The compositions may further comprise one or more free-radical initiators, one or more dissociation enhancing agents(s), cross-linking agent(s), cationically polymerizable monomer (s), cationic initiator(s), leveling agents, oligomer(s) or polymer(s), preferably co-reactive, and other additives and adjuvants to impart specific properties to the polymerized coating. The viscosity requirements vary with the electrostatic assistance coating method.

Another embodiment of the present invention is a "solvent-free" composition which may be applied to a substrate by electrostatic assistance.

Another embodiment of the present invention is a composition which can be electrosprayed onto a substrate, and in particular a rough or a three-dimensional substrate.

DETAILED DESCRIPTION

The addition of certain types of salts as conductivity enhancers to an organic composition comprising free-radically polymerizable monomers significantly enhances the composition's conductivity without the addition of a solvent. The addition of a conductivity enhancer allows compositions with insufficient conductivity for application by electrostatic assistance to achieve the requisite conductivity and thus be electrostatically coatable by continuous liquid coating, electrostatic spray coating, or electrospray coating procedures.

The conductivity requirement applies only to the application process. Once the composition is applied to a substrate, the conductivity can be significantly reduced or eliminated.

Electrostatic-assistance coating methods which rely on inductive charging require free ions (i.e., ions which are physically separated such that they behave as noncoordinated ions) in solution to serve as ionic conductors. Known ionic conductors include salts, acids, water, and polar solvents containing dissociated species. Water often is not compatible with (i.e., miscible with) an organic solution, and thus such a composition would be an emulsion or dispersion (typically at least partially ionically-stabilized) and not a true solution and thus is not electrosprayable. In addition, water must be dried off, which can add another process step and increases production cost. Acids are often volatile and corrosive. As discussed above, polar solvents may be used to enhance the conductivity by acting as a dissociation enhancing agent. However, polar solvents often evaporate during processing and thus can be harmful to the environment. Therefore, to create a solvent-free composition which can be applied by electrostatic assistance methods, salts are useful to enhance conductivity. However, not all salts are useful in organic compositions.

A single definition is not universally used for a solvent-free composition or a high-solids solution. Ideally, a solvent-free composition is 100% reactive and does not have or produce any VOCs. As known in the art, this ideal composition is difficult if not impossible to achieve. In particular, bulk polymerization significantly slows down at higher conversions, and thus 100 percent conversion or polymerization is difficult to achieve, even without considering economic limitations. To account for the non-ideal nature of compositions, some level of non-reactive components or volatile components is presumed. The U.S. Environmental Protection Agency (EPA) established a test methodology for measuring the VOC content for radiation curable materials, as found in American Society for Testing and Materials (ASTM) standard D 5403-93. Test Method A is applicable to "radiation curable materials that are essentially 100% reactive but may contain traces (no more than 3%) of volatile materials as impurities or introduced by the inclusion of various additives". To determine the presence of volatile materials, the composition is cured and then is heated to $100°±5°$ C. for 60 minutes in a forced draft oven. Weight measurements are taken (all at room temperature) of the substrate, the composition prior to cure, the composition after cure and the cured composition after heating. In the present invention, "solvent-free" compositions are those that comply with this standard and thus have a VOC content of no more than 3 weight percent.

In addition to meeting this standard, the solvent-free compositions of the present invention are preferably such that less than 2 weight percent of the total of all original components are heat-extractable during the application of ASTM D 5403-93, Test Method A. Thus, preferably at least 98 weight percent of the monomer(s), initiator(s), conductivity enhancer(s), and other additives are present in the final polymerized product regardless of the energy source used for the free-radical cure. The non-ideal nature of the polymerization is also allowed for in the less than 2 weight percent loss requirement.

To achieve this solvent-free composition, each component must be selected such that during processing, polymerization, and in the final product, the composition does not lose material by evaporation or "heat-extraction" to the extent of 2 weight percent or more.

In addition, the components preferably do not migrate into other layers of the final product, otherwise the product's properties may be detrimentally altered.

The conductivity requirements for the composition vary with the electrostatic coating method (see Table A) and the coating method may be determined by the desired coat height.

Walden's Rule (Jordan, P. C., *Chemical Kinetics and Transport*, Plenum Press, New York (1980)) provides that for a given system the product of the ionic conductivity times the viscosity is approximately a constant. Thus, ionic conductivity can be increased by decreasing viscosity. However, in spray coatings the droplet viscosity preferably is held quite low to allow for reasonable spreading and smoothing of the coating in a short time. Consequently, in electrostatic coating, and in particular in electrospray coating, the composition's viscosity is typically less than 1 pascal-second. Similar restrictions apply to the other methods. See Table A.) Because the viscosity is already required to be low for most electrostatic assistance methods, the desired conductivity cannot readily be obtained by adjusting the viscosity.

TABLE A

| Method | Range | | Preferred Range | | Most Preferred Range | |
|---|---|---|---|---|---|---|
| | Viscosity η (mPa · s) | Conduct. σ (S/M) | Viscosity η (mPa · s) | Conduct. σ (S/m) | Viscosity η (mPa · s) | Conduct. σ (S/m) |
| Electrospray | 1 to 1000 | $10^{-7}$ to $10^{-1}$ | 1 to 100 | $10^{-6}$ to $10^{-3}$ | 1 to 50 | $10^{-5}$ to $10^{-4}$ |
| Electrostatic Spraying | 1 to 2000 | $10^{-7}$ to $10^{-1}$ | 1 to 500 | $10^{-5}$ to $10^{-1}$ | 1 to 250 | $10^{-5}$ to $10^{-1}$ |
| Continuous Liquid with Electrostatic Assist | 1 to 10,000 | $10^{-7}$ to $10^{-1}$ | 1 to 1000 | $10^{-7}$ to $10^{-1}$ | 1 to 500 | $10^{-7}$ to $10^{-1}$ |

Without the requisite conductivity, a composition cannot be applied using electrostatic assistance. This substantially limits the use of these application methods. However, by adding certain types of salts to these compositions to provide sufficient conductivity in accordance with the present invention, previously non-electrostatically assistable compositions may now be applied to substrates by electrostatic assistance methods.

Conductivity Enhancers

Salts, as conductivity enhancers, contain ions held together by coulombic attraction. Simply having ions present does not mean that a salt solution is a sufficient ionic conductor. Electrostatic attraction binds oppositely charged ions together into ion pairs substantially reducing ionic conductivity. Therefore, to be sufficient conductors the ion pairs must at least partially dissociate and the ions become independent, i.e., become free ions (or, less preferably, ion triplets). Free ions can significantly increase the ionic conductivity of a composition provided they have enough inherent mobility to respond readily to the electrical field applied to the composition. The ability of the ion pairs to dissociate in a composition depends on several factors such as the dielectric constant of the medium.

As with other additives, the ion pairs (i.e., the salt) must be soluble to form a true solution for the composition to be potentially electrosprayable. Ions are required for various monomer mixtures to become conductive, but the solubilities of the salts differ, making some salts more effective than others. Because the compositions of interest are organic, salts with at least one organic ion typically have better solubilities. The solubility of such an organic salt can be tailored by proper selection of the organic group.

Generally, materials with higher dielectric constants (higher polarity) are better able to stabilize free ions. Polar materials reduce the attraction between oppositely charged ions, allowing the ion pairs to separate into free ions. In general, dissolved salt ions may be tightly paired (coordinated), and thus essentially non-conductive, or may be (as a result of their structure and environment) readily physically separated such that the ions behave as noncoordinated (or free) ions which are substantially conductive. As organic compositions become less polar and thus have a lower dielectric constant, the equilibrium between the free ions and the tight ion pairs shifts toward the latter. Therefore, salts dissolving to form ion pairs which readily dissociate into free ions despite less favorable conditions (i.e., low polarity and low dielectric constant mixtures) are desirably selected to enhance conductivity.

It is believed that the ease of dissociative separation of two ions is favorably influenced by charge delocalization in one or both of the ions and/or by steric hindrance around the charge center which prevents the counter-ion from tightly coordinating into an ion pair. Steric hindrance around the charge site of the ion can diminish accessibility to the counter-ion and therefore ions tend to be paired less tightly. If sterically hindering groups do not interfere with salt solubility, greater steric hindrance will favor ion-pair separation into individual ions and tend to enhance the composition's ionic conductivity. However, increased ionic size will eventually reduce conductivity due to reduction in ion mobility. Electron withdrawing groups, particularly fluorine or fluorinated groups, generally increase charge delocalization within the anionic portion and thereby enhance conductivity.

Ions can have multiple charges. Generally, monovalent ions more readily solubilize and dissociate into free ions with the selected monomer mixtures. Bivalent and trivalent ions may also be used, but unless well "stabilized" are generally less preferred because the extra charge favors tight ion aggregation over larger distances. Polymeric ions, such as from a salt of polyacrylic acid, are by their size severely restricted in mobility, and thus, limited in conductivity especially in viscous media.

The conductivity enhancers are non-volatile, or their vapor pressures are 1 kPa or less at 25° C., preferably 0.5 kPa or less at 25° C., and more preferably 0.1 kPa or less at 25° C. Preferably, the conductivity enhancers do not decompose to form volatiles, or become heat or water extractable at any time during processing, or from the final product. Preferably, the conductivity enhancers increase the composition's conductivity when added in relatively low amounts. Typically, from about 0.001 weight percent to about 10 weight percent is added, preferably from about 0.001 weight percent to about 1 weight percent is added. Further, the conductivity enhancers must not interfere with polymerization. Conductivity enhancers useful in the present invention include salts having an inorganic or organic cation and a bulky, carbon-containing, non-coordinating, organophilic anion to promote dissolution and ionic dissociation of the salt in organic monomers. Preferably the anion has a formula weight of at least 200 kg/kmol.

Preferably, at least one part of the selected conductivity enhancer copolymerizes with the rest of the composition. However, if the conductivity enhancers are added in a small quantity and are physically trapped within the cured composition and thus substantially do not migrate to other layers of the substrate, evaporate, or become extractable when heated or exposed to water, the conductivity enhancers need not copolymerize. Migrating conductivity enhancers may undesirably interfere with the final product's properties.

Useful anions include, but are not restricted to alkyl, cycloalkyl and aryl sulfonates, fluoroalkylsulfonylimides, fluoroalkylsulfonylmethides, arylborates, carborane anions, and metallocarborane anions. In certain cases, boron catecholates are useful. Preferably the anions are halogen-substituted and most preferably the halogen is fluorine.

The most preferred salts (conductivity enhancers) of this invention comprise fluorinated anions which are (fluoroalkylsulfonyl)imide (I), (fluoroalkylsulfonyl)methide (II), fluoroalkylsulfonate (III), or fluorinated or fluoroalkylated arylborate anions (IV) having the respective formulae:

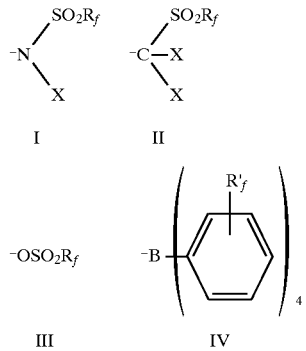

where X is selected from the groups: H, alkyl, alkenyl, aryl, alkaryl, —SO$_2$R, —SO$_2$R$_f$, —SO$_2$F, C(O)R, and —C(O)R$_f$, but is preferably —SO$_2$R$_f$.

R is selected from the group consisting of alkyl, cycloalkyl, aralkyl, substituted alkyl, aryl, and substituted aryl groups. The substituted aryl may contain halogen or haloalkyl substituents, preferably fluorine or fluoroalkyl substituents.

R$_f$ can be a monovalent fluorinated saturated aliphatic radical containing at least one carbon atom. Where the radical contains a plurality of carbon atoms in a skeletal chain, such chain may be branched or cyclic. The skeletal chain of carbon atoms can be interrupted by heteromoieties, such as divalent oxygen or trivalent nitrogen atoms each of which is bonded only to carbon atoms, or hexavalent sulfur atoms each of which may be bonded to carbon, fluorine, or oxygen atoms, but preferably where such heteromoieties are present, such skeletal chain does not contain more than one said heteromoiety for every two carbon atoms. An occasional carbon bonded hydrogen atom, bromine atom or chlorine atom may be present. Where present, however, they preferably are present not more than once for every two carbon atoms on the average. Thus, the non-skeletal valence bonds are preferably carbon-to-fluorine bonds. That is, R$_f$ is preferably perfluorinated.

The total number of carbon atoms in R$_f$ can vary and be, for example, 1 to 12, preferably 1 to 8, and more preferably 1 to 4. Where R$_f$ is or contains a cyclic structure, such structure preferably has 5 or 6 ring members, one or two of which can be said heteromoieties, e.g., oxygen and/or nitrogen. Where two or more R$_f$ groups occur in a single formula, they can be the same or different and may be linked together to form a cycle. Alternatively, R$_f$ can be a fluorinated or fluoroalkylated aromatic group or a fluorine atom.

The R$_f$' moiety in formula (IV) represents one or more fluorinated substituent(s) per aromatic ring and can be one or more fluorine atoms or R$_f$ groups according to the above description wherein R$_f$ is preferably CF$_3$. Preferably, the total number of non-ring carbon atoms per aromatic ring represented collectively by R$_f$' is not greater than 4. More preferably, formula (IV) is PFTPB (tetrakis[pentafluorophenyl]borate) and TFPB (tetrakis[3,5-bis-trifluoromethylphenyl]borate). A plurality of R$_f$' moieties associated with a single borate anion may be the same or different and may be arranged in any combination.

R and R$_f$ may further contain polymerizable functionality which is reactive with the monomers in which the salt is dissolved, thus providing a mechanism for immobilization of the anion during polymerization. Such immobilization may be necessary in applications where the extraction, leaching, or migration of the salt in the cured composition is undesirable.

Of the anions represented by formulae (I) through (IV), the imide, methide, and aryl borate anions of formulae (I), (II), and (IV) are most preferred based upon solubility and conductivity.

Examples of anions useful in the practice of the present invention include, but are not limited to:

(C$_2$F$_5$SO$_2$)$_2$N$^-$,
(C$_4$F$_9$SO$_2$)$_2$N$^-$,
(C$_8$F$_{17}$SO$_2$)$_3$C$^-$,
(CF$_3$SO$_2$)$_3$C$^-$,
(CF$_3$SO$_2$)$_2$N$^-$,
(C$_4$F$_9$SO$_2$)$_3$C$^-$,
(CF$_3$SO$_2$)$_2$(C$_4$F$_9$SO$_2$)C$^-$,
(CF$_3$SO$_2$)(C$_4$F$_9$SO$_2$)N$^-$,
[(CF$_3$)$_2$NC$_2$F$_4$SO$_2$]$_2$N$^-$,
(CF$_3$)$_2$NC$_2$F$_4$SO$_2$C$^-$(SO$_2$CF$_3$)$_2$,
(3,5-(CF$_3$)$_2$C$_6$H$_3$)SO$_2$N$^-$(SO$_2$CF$_3$),
(CF$_3$SO$_2$)(FSO$_2$)N$^-$,
(CF$_3$SO$_2$)$_2$(FSO$_2$)C$^-$,
(CF$_3$SO$_2$)$_2$(H)C$^-$,
(CF$_3$SO$_2$)$_2$(C$_6$H$_5$)C$^-$,

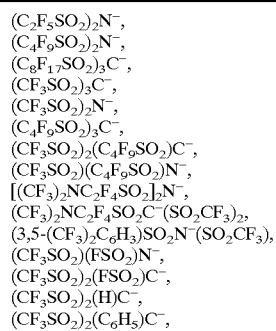

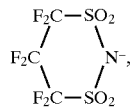

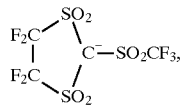

C$_6$F$_5$SO$_2$C$^-$(SO$_2$CF$_3$)$_2$,
C$_6$F$_5$SO$_2$N$^-$SO$_2$CF$_3$,

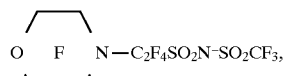

(F—C$_6$H$_4$SO$_2$)(CF$_3$SO$_2$)N$^-$,
(H—CF$_2$CF$_2$SO$_2$)N$^-$,
(ClCF$_2$CF$_2$SO$_2$)$_2$N$^-$,

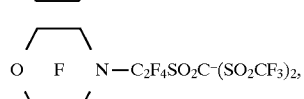

CF$_3$SO$_3$$^-$,
(CF$_3$)$_2$NC$_2$F$_4$SO$_3$$^-$,
C$_4$F$_9$SO$_3$$^-$,
3,5-(CF$_3$)$_2$C$_6$H$_3$SO$_3$$^-$,

-continued

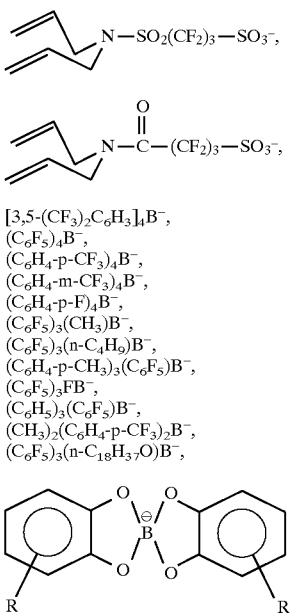

[3,5-$(CF_3)_2C_6H_3]_4B^-$,
$(C_6F_5)_4B^-$,
$(C_6H_4$-p-$CF_3)_4B^-$,
$(C_6H_4$-m-$CF_3)_4B^-$,
$(C_6H_4$-p-$F)_4B^-$,
$(C_6F_5)_3(CH_3)B^-$,
$(C_6F_5)_3$(n-$C_4H_9)B^-$,
$(C_6H_4$-p-$CH_3)_3(C_6F_5)B^-$,
$(C_6F_5)_3FB^-$,
$(C_6H_5)_3(C_6F_5)B^-$,
$(CH_3)_2(C_6H_4$-p-$CF_3)_2B^-$,
$(C_6F_5)_3$(n-$C_{18}H_{37}O)B^-$,

In general, the above-described bis(perfluoroalkylsulfonyl)imide and cyclic perfluoroalkylenedisulfonylimide salts can be prepared as described in U.S. Ser. No. 08/531,598 (Lamanna et al) and U.S. Ser. No. 08/398,859 (Waddell) incorporated by reference herein in their entirety. These salts are prepared from the reaction of fluoroalkylsulfonyl fluorides, $R_fSO_2F$, or perfluoroalkylenedisulfonyl fluoride, $FSO_2R_{f3}SO_2F$, with anhydrous ammonia. Symmetrical imides in which $R_{f1}$ and $R_{f2}$ are the same can be prepared in a single step using a weakly basic organic solvent such as triethylamine as shown in Scheme I, whereas unsymmetrical imides in which $R_{f1}$ and $R_{f2}$ are different must be prepared in two steps as shown in Scheme II.

Scheme I

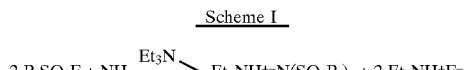

Scheme II

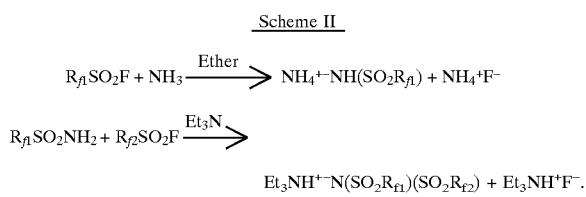

Cyclic perfluoroalkylenedisulfonylimide salts can be prepared as described in U.S. Pat. No. 4,387,222, incorporated herein by reference in its entirety.

Perfluoroalkylsulfonylfluorides and perfluoroalkylenedisulfonyl-fluorides used as precursors to the imide and methide salts of this invention can be prepared by a variety of methods known in the art as described, for example, in U.S. Pat. Nos. 3,542,864; 5,318,674; 3,423,299; 3,951,762; 3,623,963; 2,732,398, and S. Temple, *J. Org. Chem.*, 33(1), 344 (1968), D. D. DesMarteau, *Inorg. Chem.*, 32, 5007 (1993), all of which are incorporated herein by reference in their entirety.

Fluoroalkylenesulfonylfluorides having polymerizable functional groups have been described by Gard et al., J. Fluorine Chem. 66, 105 (1994), Gard et al., Coordination Chemistry Reviews 112, 47 (1992), Gard et al., J. Fluorine Chem., 49, 331 (1990), Gard et al., J. Fluorine Chem. 43, 329 (1989), Gard et al., J. Fluorine Chem. 67, 27 (1994), Gard et al., J. Fluorine Chem. 55, 313 (1991), Gard et al., J. Fluorine Chem. 38, 3 (1988), Gard et al., Inorg. Chem., 29, 4588 (1990), U.S. Pat. No. 5,414,117 (Armand), and U.S. Pat. No. 5,463,005 (DesMarteau). Polymers prepared from fluoroalkylenesulfonylfluorides having polymerizable functional groups have been described in DesMarteau, *Novel Fluorinated Acids for Phosphoric Acid Fuel Cells*, Gas Research Institute Report #GRI-92/0385, July 1992, and J. Fluorine Chem., 72, 203 (1995).

In general, the above-described perfluoro-organic sulfonate salts are prepared as generally described in U.S. Ser. No. 08/398,859 (Waddell et al.) incorporated by reference herein in its entirety. These salts are prepared by hydrolysis of the corresponding perfluoroorganosulfonyl fluoride, via reaction with a basic salt having the desired cation (e.g., a carbonate, hydroxide, or alkoxide salt) in the presence of water and, optionally, an additional polar solvent.

Processes useful for the synthesis of fluorochemical imide salts are described in:

1. D. D. Des Marteau et al., *Inorg. Chem.*, 1984, 23, pp. 3720–3723;
2. D. D. Des Marteau et al., *Inorg. Chem.*, 1990, 29, pp. 2982–2985;
3. Canadian Patent 2000142-A;
4. U.S. Pat. No. 4,505,997; and
5. U.S. Pat. No. 5,072,040.

Processes useful for the synthesis of fluorochemical methide salts and their conjugate acids are described in:

1. U.S. Pat. No. 5,273,840; and
2. Turowsky and Seppelt, *Inorg. Chem.*, (1988) 27 pp. 2135–2137.

To prepare the perfluoroorganosulfonyl fluoride, the corresponding hydrocarbon sulfonyl fluoride (prepared, e.g., according to techniques described in Hansen, U.S. Pat. No. 3,476,753, which is incorporated by reference herein in its entirety) is perfluorinated by electrochemical fluorination according to the methods described in Hansen U.S. Pat. No. 3,476,753, Simons, U.S. Pat. No. 2,519,983, and *Chemistry of Organic Fluorine Compounds*, Milos Hudlicky, ed., 2d ed., PTR Prentice Hall (New York), pp. 73–76 (all of which are incorporated by reference herein in their entirety), followed by purification.

In general, the conductivity enhancers of the present invention can be prepared as described in WO95/03338 (Lamanna et al.), hereby incorporated by reference in its entirety, by anion exchange or metathesis reactions by combining salts that contain the desired cation and conventional counteranions, such as chloride, $PF_6^-$, $SbF_6^-$, or $BF_4^-$, with simple salts, such as alkali or alkaline earth metal salts or alkylammonium salts, of the nonnucleophilic anions of the invention in a suitable solvent. Generally, metathesis reactions may be carried out at temperatures ranging from about −80° C. to about 100° C., preferably at ambient temperature, under conditions in which either the salt of the instant invention or the metathesis byproduct(s) selectively precipitates, thus permitting isolation of the salt of the invention in the form of a solution or a pure solid. Alternatively, ion metathesis may be achieved by passing a solution of salt through a column of an insoluble anion exchange resin containing a nonnucleophilic anion of the invention. The salts of the invention will form in situ if the individual components described above are added directly to the composition capable of being applied by electrostatic assistance. It is preferred, however, to form the pure salt (conductivity enhancer) in a separate step as a solid or in a suitable solvent prior to adding the same to the electrostatically-assistable composition and performing the coating and polymerization process.

Suitable metathesis solvents generally are capable of dissolving at least one and preferably all of the reagents required for the metathesis reaction without reacting with these reagents. Solvents are generally selected such that the desired salt or the metathesis byproducts selectively precipitate, thus allowing the desired salt to be isolated in relatively pure form. Normally, the preferred solvent for a particular system is determined empirically. In the cases where an anion exchange resin is used, the solvent should not dissolve the resin, but should dissolve the metathesis reagents and the desired product salt. Nonlimiting examples of suitable solvents include water; chlorocarbons, such as methylene chloride, and chloroform; ethers; aromatic hydrocarbons, such as toluene, and chlorobenzene; nitrites, such as acetonitrile; alcohols, such as methanol and ethanol; nitrobenzene; nitromethane; ketones, such as acetone and methyl ethyl ketone; and other similar classes of organic solvents. Mixtures of solvents are often desirable to control solubility of reagents and product salts.

The sodium and lithium salts of $[3,5-(CF_3)_2C_6H_3]_4B^-$ (TFPB$^-$) were prepared following published techniques (H. Kobayashi, et al. in $Bull\ Chem.\ Soc.,\ Jpn.$, 57, 2600 (1984), incorporated herein by reference herein in their entirety.

$[Li[B(C_6F_5)_4]]2(C_2H_5)_2O$ was prepared as described in WO95/03338 (Lamanna et al.) incorporated by reference herein in its entirety.

$C_6F_5Li$ (70 mmole) was prepared according to the method described by A. G. Massey and A. H. Park, Organometallic Synthesis, 3, 461 (1986), modified by using as the solvent a mixture of 200 mL of hexane and 50 mL of diethyl ether. To this mixture at a temperature of $-78°$ C., 17.5 mL of 1.0M $BCl_3$ in hexane was added dropwise. After stirring overnight, crude product was collected on a Schlenk filter and vacuum dried. The crude material was purified by Soxhlet extraction under vacuum with anhydrous methylene chloride to produce a white, powdery product. This product was dried under high vacuum producing a yield of 13 grams (77 percent). $^1H$ NMR analysis showed the product to contain 2.1 moles of diethyl ether per formula weight. Because the product was hygroscopic, it was stored under dry nitrogen.

$Li[B(n-butyl)(C_6F_5)_3]$ was prepared as described in WO95/03338 (Lamanna et al.). To a stirred suspension of 1.17 grams (2.3 mmoles) $(C_6F_5)_3B$ in 10 mL of hexane, 0.95 mL of a 2.5M solution of n-butyllithium in hexane under nitrogen was added. A white solid product precipitated and after 30 minutes it was isolated by filtration and washed with 5 mL hexane. After vacuum drying, the yield was 0.98 gram. $^{11}B$ NMR (toluene): $-7.7$ (s) ppm relative to $BF_3(OEt_2)$.

The cationic portion of the salts of this invention can be virtually any organic or inorganic cation. For example, preferred cations are alkali metal, alkaline earth metal, or group Va, VIa, or VIIa onium cations such as ammonium, alkylammonium, and other nitrogen-onium, phosphonium, arsonium, iodonium, and sulfonium cations. Said cations may preferably also contain polymerizable functionality for immobilization of the salt.

The most preferred salts can be used at concentrations below 1 weight percent and do not require any dissociation enhancing agent. Dissociation enhancing agent(s) may be added or salts may be used at concentrations greater than 1 weight percent in order to increase the ionic conductivity of relatively nonconductive mixtures.

Dissociation Enhancing Agents

The dissociation of the ion pairs may also be enhanced by the addition of one ore more dissociation enhancing agent (s). These dissociation enhancing agents will associate with (i.e., "stabilize") one or both of the ions of the salt. As with each component, the dissociation enhancing agents when added preferably should meet the "solvent-free" requirements and preferably not interfere with the polymerization. Typically, when dissociation enhancing agent(s) are a part of the composition, at least 0.1 weight percent is added, preferably about 0.5 to about 5 weight percent. Preferred dissociation enhancing agent(s) have a dielectric constant of at least 5 at 20° C. More preferably the dielectric constant is at least 10 at 20° C., and most preferably the dielectric constant is at least 20 at 20° C. Examples are well known in the art and include materials such as polyethylene glycols, crown ethers and kryptands, and poly(ethylene oxides) which in combination with alkali salts, selectively complex the metal ion of the ion pair thus inducing dissociation. Small amounts of co-reactive and more polar monomers can also be used to enhance dissociation, provided they do not adversely affect the properties of the cured coatings. Examples of such monomers include, but are not limited to, N-vinyl pyrrolidinone, N,N-dimethyl acrylamide, methacrylic acid, 2-ethoxy ethylacrylate, Carbowax™ 750 acrylate (available from Union Carbide, Danbury, Conn.) and the like.

Monomers

The monomers selected for these compositions are essentially completely miscible with the other components of the mixture. In addition, these monomers have sufficiently low vapor pressures so that little material loss occurs during processing. Preferably, the monomers are non-volatile, or are such that their vapor pressures are 1 kPa or less at 25° C., more preferably 0.5 kPa or less at 25° C., and most preferably 0.1 kPa or less at 25° C. Monomers are also selected and at concentrations based on the desired use for the composition. Useful monomers include both monofunctional and multi-functional monomers.

Typical free-radically curable monofunctional monomers and co-monomers include ethylenically unsaturated compounds, such as vinyl or vinylidene functional materials. Examples of these monomers include, but are not limited to, acrylate and methacrylate monomers, vinyl esters, methacrylamides, acrylamides, fumarates, styrenes, maleimides and the like.

The ethylenically unsaturated group can be attached to an aliphatic or aromatic group with from 1 to 26 carbon atoms, more preferably from 4 to 20 carbon atoms. Monomers with less than 4 carbon atoms are still sprayable, but typically are volatile, thus the composition would no longer be solvent-free as defined herein. When the number of carbon atoms exceeds 26, the monomers typically become solid or syrupy, and large amounts of lower viscosity reactive or inert diluents would be required to solvate the solid monomers or decrease the composition's viscosity so that it may be electrosprayed. The backbone of the aliphatic or aromatic groups may contain heteroatoms and may be partially or fully fluorinated.

Examples of these monomers and co-monomers include, but are not limited to, n-butyl acrylate, 2-methyl-butyl acrylate, 2-ethylhexyl acrylate, isooctylacrylate, 2-ethoxyethyl acrylate, 2-ethoxyethyl methacrylate, lauryl acrylate, tetrahydrofurfuryl acrylate, 2-phenoxyethyl acrylate, styrene, vinyl pyridine, decyl vinyl ether, allyl benzoate, 1,1-dihydro-perfluorooctylacrylate, glycidyl acrylate, vinyl hexanoate, vinyl pivalate, diethyl fumarate, N-phenyl maleimide, N,N-dimethyl acrylamide, N,N-diethyl acrylamide, N,N-dimethyl aminoethyl acrylate, N,N-dimethyl aminoethylmethacrylate, 2-acryloxy propyldihydrogen phosphate, styrene-4-sulfonic acid and salts thereof, N-vinyl pyrrolidinone, N-vinyl-n-methylformamide, acrylic acid, methacrylic acid and the like.

Multifunctional ethylenically unsaturated monomers are sometimes useful. The ethylenically unsaturated group may be a vinyl or a vinylidene group. Examples include, but are not limited to, 1,4-butanediol diacrylate, 1,3-butanediol diacrylate, 1,6-hexanediol diacrylate, trimethylolpropane triacrylate, pentaerythritol tetraacrylate, their ethoxylated or propoxylated analogs, divinylbenzene, diethylene glycol diacrylate, 1,6-hexanediol (bis-monofumarate), divinyl adipate, diallyl adipate, triallyl cyanurate, β-acryloxypropionates of 1,6-hexanediol, and the like. Drying oils such as linseed oil, boiled linseed oil, or tung oil, may also be used.

Ethylenically unsaturated monomers in combination with multifunctional thiol (i.e., mercaptan), compounds, or a polyamine, may also be used. The ethylenically unsaturated monomers may be selected from the broad classes of multifunctional vinylidene or vinyl compounds discussed above, but preferably are chosen from olefins not readily homopolymerizable. α-Mercaptoglycolates and β-mercaptopropionates are particularly useful. Typical examples of multifunctional thiols are pentaerythritol tetrakis (β-mercaptopropionate), pentaerythritol tetrakis (α-mercaptoglycolate), mercaptoalkyl functional polydiorganosiloxanes, 1,4-butanediol bis(β-mercaptopropionate) and the like. The polyamine reagents for the ene-amine compositions can be multifunctional primary, secondary, or tertiary amines, the tertiary being preferred. Illustrative examples of tertiary amines are disclosed in EP 0 262 464 and include, but are not limited to, acrylic copolymers containing co-polymerized tertiary amine-functional monomers such as dimethylaminoethyl acrylate or the corresponding methacrylate, acrylamide or methacrylamides. The corresponding diethylamino compounds as well as the corresponding monomers in which the aminoethyl group is replaced by aminopropyl or aminobutyl, are also useful.

Initiators

With the possible exception of ene-thiol and ene-amine compositions, the free-radical polymerization of these compositions should be carried out in as oxygen-free an environment as possible, e.g., in an inert atmosphere such as nitrogen gas. Ene-thiol and ene-amine compositions may be cured in the presence of oxygen. Generally, the initiator comprises from about 0.1 to about 3 percent by weight of the total weight of the compositions. See generally, Radiation Curing in Polymer Science and Technology, Vol. 1–4, J. P. Fouassier and J. F. Rabek, Elsevier Applied Science, New York, 1993. Polymerization may also be initiated with high energy irradiation, such as electron beam or gamma rays. These high energy irradiation systems do not always require initiators.

Light (ultraviolet or visible) may be used to initiate polymerization. Photoinitiators include materials which undergo fragmentation upon irradiation, hydrogen abstraction type initiators, and donor-acceptor complexes. Suitable photofragmentation initiators include, but are not limited to, those selected from the group consisting of benzoin ethers, acetophenone derivatives such as 2,2-dimethoxy-2-phenyl acetophenone, 2-hydroxy-2-methyl-1-phenylpropan-1-one, 2,2,2-trichloroacetophenone and the like. Suitable hydrogen abstraction type initiators include benzophenone and derivatives thereof, anthraquinone, 4,4'-bis(dimethylamino) benzophenone (Michler's ketone) and the like. Suitable donor-acceptor complexes include combinations of donors such as triethanolamine with acceptors such as benzophenone. Also suitable are sensitizers with initiators such as thioxanthone with quinoline sulfonylchloride.

Thermal energy also may be used to initiate polymerization. Thermal initiators may be selected from the conventional peroxide or azo type materials commonly available. Illustrative examples include benzoylperoxide, 2,2'-azo-bis (isobutyronitrile), 1,1'-azo-bis(cyclohexane-1-carbonitrile), dicumylperoxide and the like. Redox initiators, such as amines with peroxides, cobaltous carboxylate salts with peroxides, or persulfate/bisulfite redox pairs, may also be used provided the initiators are completely soluble in the monomer mixtures and do not prematurely initiate the reaction thus interfering with the coating process by slowly increasing the viscosity of the solution. If needed, the initiator can first be applied to the substrate by any conventional means.

Cross-linking Agents

If desired, cross-linking agent(s) can be added to the monomer composition.

Useful cross-linking agents are well-known in the art. Examples include, but are not limited to, multifunctional acrylates or allyl compounds, photoactive triazines, copolymerizable benzophenone compounds such as 4-acryloxybenzophenone, multifunctional benzophenone crosslinkers, melamines, divinyl benzene, divinyl silane compounds, bis-vinyl ethers, bis-vinyl esters, vinyl functional trialkoxysilanes, vinyl functional ketoximinosilanes, and the like.

Additional Additives

Cationically polymerizable monomers, such as vinyl ethers, cyclic ethers, styrenes, vinylidene ethers and the like, may be added to the free-radically polymerizable monomers of the present invention to obtain a "hybrid" composition. When cationically polymerizable monomers are added, a cationic initiator must also be added. Cationic initiators include, but are not limited to, Lewis acids, organic protonic acids, anhydrides, onium salts, ferrocenium salts, or salts of organometallic cations. Some initiators may trigger both free-radical and cationic polymerization. For example, onium and organometallic salts such as diaryliodonium and triarylsulfonium salts and (cyclopentadienyl) (arene) iron$^+$ salts of the anions $PF_6^-$ and $SbF_6^-$ may be useful.

When two initiators are present, the activation mechanism may be the same or different. When the mechanism is the same (e.g., heat or radiation), initiators can be selected such that the activation energy differential triggers polymerization at different points in time. In some cases, it may be desirable that the cationic and free-radical polymerization occur simultaneously, for example interpenetrating polymer networks useful for coatings. An example of different activation mechanisms is a UV initiator for free-radical polymerization and a heat-activated initiator for cationic polymerization.

In order to achieve specific functionality in the finished coating, the monomers and other components are selected to impart the desired properties. For example, as is well-known in the art, higher alkylacrylates can function as pressure-sensitive adhesive coatings, "basic" monomers such as N,N-dimethylamino ethylmethacrylate or N,N-dimethyl acrylamide can function as primers for acidic polymers, and fluorochemical acrylates can function as stain-resistant coatings.

However, for some applications, it is necessary to include certain coreactive oligomers to obtain the desired properties. For example, for low adhesion backsize in a pressure-sensitive tape applications, copolymerizable polydiorganosiloxanes, such as ACMAS (acrylamidoamido siloxane) and MAUS (methacryloxyurea siloxane) as disclosed in EPO Appln. no. 92.907947.3, Publ. No. 583259 (Mazurek et al.), Goldschmidt Tego™ RC 706 acrylate functional polydimethylsiloxane (available from Goldschmidt AG, Essen, Germany) and the like, are added to the composition in varying amounts to obtain various levels of release properties.

Similarly, it may be beneficial to use polyethyleneglycol diacrylates as part of the composition to impart hydrophilicity to the finished coating. Numerous examples may be found in the literature where reactive oligomers such as polyurethanes, polyesters, polyethers, silicones and the like are used to impart scuff resistance, abrasion resistance, toughness, lubricity, friction and other properties to the finished coating.

These reactive oligomers preferably do not detrimentally interfere with the conductivity and sprayability of the monomer/oligomer mixture. In some cases, the oligomer need not be coreactive with the rest of the composition. Additives such as flatting agents, dyes, pigments, plasticizers, or tackifiers and the like may be used or non-functional flow enhancers and wetting agents may be added to improve the aesthetics of the coating. These additives preferably are soluble in the compositions, are nonvolatile, and preferably do not detrimentally interfere with the conductivity or curability of the compositions.

A composition of the present invention may be prepared by mixing together in a suitable vessel one or more free-radically polymerizable monomer(s) and optionally one or more free radical initiator(s), such that when in combination have a conductivity) insufficient to be applied by means of electrostatic assistance (i.e., electrostatically assisted continuous liquid coating, electrostatic spray coating, electrospray coating). One or more conductivity enhancer(s) and optionally one or more dissociation enhancing agent(s) may be added to increase the conductivity yielding an application composition. The composition may then be coated onto a substrate using the selected electrostatic assistance method and then polymerized by exposure to electron beam, gamma rays, visible light, ultraviolet radiation, or heat. Typically, the substrate has two major surfaces, and the composition is applied to at least a portion of at least one major surface.

One embodiment of the present invention is a release coating composition on a substrate where the substrate comprises a backing having first and second sides, an adhesive layer having two sides, one side coated onto the first side of the backing, and a release layer on the second side of the backing comprising the polymerized composition formulated as a release coating. Preferably the release coating composition is electrosprayed onto the second side of the backing. When the release coating is used on pavement marking tapes and other such rolled substrates, the substrate is rolled such that the first side of the backing (if already adhesive coated, the adhesive layer) contacts the release layer.

Other embodiments include, but are not limited to primers, thin adhesives, anti-fogging coatings, ice release coatings, anti-graffiti coatings, abrasion-resistant coatings, durable coatings, light-scattering coatings, hard coats, stain-resistant coatings, scuff-resistant coatings, and matte surface coatings. Suitable monomers and additives for each application as well as choice of coating thickness may be readily selected by those skilled in the art.

Suitable substrates include, but are not limited to, a sheet, a fiber, or a shaped object. The composition may be applied to at least one major surface of suitable flexible or inflexible backing materials and then cured. Useful flexible backing materials include plastic films such as poly(propylene), poly(ethylene), poly(vinyl chloride), poly (tetrafluoroethylene), polyester (e.g., poly(ethylene terephthalate)), polyimide film such as DuPont's Kapton™, cellulose acetate, and ethyl cellulose. Backings may also be constructions with irregular surfaces such as woven fabric, nonwoven fabric, paper, or rough surfaces. Backings can thus also be of woven fabric formed of threads of synthetic or natural materials such as cotton, nylon, rayon, glass, or ceramic material, or they can be of nonwoven fabric such as air-laid webs of natural or synthetic fibers or blends of these, provided they are not too porous. Due to its high porosity, paper itself is usually not suitable unless heavier coatings of greater than one micrometer are applied to offset soaking into the paper. However, glassine, plastic coated, or impregnated paper is suitable. Rough surfaces include embossed or patterned surfaces or particle impregnated resins such as abrasive particle covered (epoxy) resin and glass bead covered resins. In addition, suitable substrates can be formed of metal, metallized polymeric film, ceramic sheet material, natural or synthetic rubber, or pavement marking tapes.

EXAMPLES

The following examples illustrate various specific features, advantages, and other details of the invention. The particular materials and amounts recited in these examples, as well as other conditions and details, should not be construed in a manner that would unduly limit the scope of this invention.

Solubility Test

The solubility of the conductivity enhancer for each composition was determined by the following method. A sample of the conductivity enhancer was mixed with a clear monomer solution at room temperature for a maximum of two hours and then checked under agitation for optical clarity. If the conductivity enhancer containing sample was not totally clear or a "true solution", the sample was moderately heated (such that the sample could be held by hand) and then allowed to cool to room temperature. A sample which contained visible conductivity enhancer particles was deemed to have failed.

Viscosity Measurement

The Brookfield viscosity (in centipoise (cp), 1 cp=1 mPa·s) was measured at room temperature with a Brookfield digital viscometer model DV-II available from Brookfield Engineering Laboratories, Inc., Stoughton, Mass.

Conductivity Measurements

The electrical conductivity of a solution was measured by inserting a simple cell composed of two parallel stainless steel rods acting as electrodes into a glass jar containing the solution. The rods, each about 9 cm long and about 3 mm in diameter, were separated by 1 cm center-to-center spacing and were maintained parallel by having both rods embedded at one end into a piece of insulated material (either a standard rubber bottle stopper or a piece of Garolite available from McMaster-Carr, Chicago, Ill.). The height H was the height of the solution meniscus relative to the bottom of the rods. When the rods were placed in a solution at height H, and an electrical potential was applied across the rods, an electrical current attempted to flow between the rods. The solution, air, and insulator provided a net resistance R to the electrical current flow. When the rods were placed to height H in a solution that was reasonably more conductive than air, then the effective resistance was that of the solution. For example, the conductivity of air is approximately $10^{-12}$ S/m or $10^{-6}$ μS/m, and the conductivity of insulators is even lower, thus for a solution having a conductivity greater than 0.001 μS/m the resistance R, to within 0.1 percent, was effectively due only to the solution. Resistance R is directly proportional to a geometry factor G and is inversely proportional to the electrical conductivity σ, and thus G=Rσ. G depends on the height H as well as other fixed parameters such as the separation-distance of the rods and the diameter of the rods. If these fixed parameters are defined as a second geometry factor g then, g=GH where g is a constant defined by the specific geometry of the electrode structure. The value of g was determined using a solution having a known conductivity $\sigma_o$ which gives a resistance $R_o$ when the rods are placed to some specific height $H_o$ in the solution. Because $\sigma_o$ was known and $R_o$ was measured, the geometry factor $G_o$ was determined from $G_o=R_o\sigma_o$. Knowing $H_o$, g was determined using $g=G_oH_o$. Because g is a constant, $g=G_oH_o=GH$, and because g is known, G can be determined for any rod-electrode immersion depth H.

To calibrate the rod-electrode cell, the cell constant g was determined using several salt solutions of known conductivity (Standard Reference Materials (1500, 10000 and 50000 μS/m), available from National Institute of Standards and Technology (NIST), Gaithersburg, Md.). The constant g varied from about 60 cm/m at 1500 μS/m to a value of about 70 cm/m at 50,000 μm. When an impedance analyzer was used to measure the dielectric constant of methanol, isopropyl alcohol (IPA) and methyl ethyl ketone (MEK), g had to be adjusted to obtain the dielectric constant values noted in the Handbook of Chemistry and Physics (CRC Press, Inc., Boca Raton, Fla.). When these g values were plotted against the natural logarithm of the measured conductivity for IPA, MEK, and methanol, and the g values determined using the NIST solutions were also plotted against the natural logarithm of the NIST solution values, all g values fell on the same straight line. As a result, g=59.45 cm/m was chosen which gave the exact conductivity at 1000 μS/m. With this value of g, all reported conductivity data deviated by about 10 percent per conductivity decade away from 1000 μS/m, being lower for conductivity below 1000 μS/m and higher for conductivity above 1000 μS/m. For example, a conductivity reported as 100 μS/m was actually about 10 percent lower, one reported as 10 μS/m is actually about 20 percent lower, etc. Using g=59.45 cm/m, the conductivity σ was determined from the resistance across the cell by the formula σ=g/(HR), where R is the resistance of the solution when the cell was inserted in the solution to height H.

Three methods were used to determine the resistance R and hence the conductivity σ of the solution.

In Method I, a Hewlett Packard LF (Low Frequency) Impedance Analyzer Model 4192A (Hewlett Packard Company, Palo Alto, Calif.) was connected across the cell and the admittance Y and the angle D were recorded at frequencies F of 100, 300, 500, 700, 900, and 1000 kilohertz (kHz) along with the immersion depth H of the rods in the solution. This information was used to calculate the conductivity by the formula σ=(gYcosD)/H. For Method I, the dielectric constant $\epsilon_r$ of the solution may also be computed by the formula $\epsilon_r=(gYsinD)/(2\pi\epsilon_o FH)$ where $\epsilon_o$ is the permittivity of free space ($8.85\times10^{-12}$ farads per meter (F/m)).

In Method II, a BK Precision Model 878 Universal LCR Meter (BK Precision, Maxtec International Corporation, Chicago, Ill.) was connected across the cell and the resistance R at a frequency F of 1 kHz was measured along with the immersion depth H of the rods in the solution. The conductivity was then computed by the formula σ=g/(HR).

In Method III, the cell was connected in series with a resistor $R_s$ of 1 MΩ, a micro-ammeter A and a switch S. This series circuit was then connected across a standard 9-volt dry cell battery. After the cell was immersed to a height H in the solution the switch S was momentarily closed and the initial reading $I_s$ on the ammeter was recorded. Along with $I_s$, the immersion depth H of the electrodes was recorded. In Method III, the battery voltage $V_b$ may be connected across a switch placed in series with the ammeter and a calibration resistor $R_c$ of 1 MΩ. When this switch was closed the measured current $I_c$ times the resistance $R_c$ gave the voltage of the battery. This information was then used to calculate the conductivity of the solution by the formula $$\sigma = g/H\left(\frac{[I_cR_c]}{I_s} - R_s\right).$$

Table of Components

| Component | Source |
|---|---|
| 1,6-hexanediol diacrylate (1,6-HDDA) | SR 238, Sartomer Company, West Chester, PA |
| 1,10-phenanthroline | Aldrich Chemical Co., Milwaukee, WI |
| 12-crown-4 | Aldrich Chemical Co., Milwaukee, WI |
| 2-Et-4-Me-imidazole HTFPB | generally disclosed in WO95/03338 (Lamanna et al.) |
| 2,2'-azobis(isobutyronitrile) (VAZO ™ 64) | DuPont, Wilmington, DE |
| AA acrylic acid | Aldrich Chemical Co., Milwaukee, WI |
| α,ω-MethAcryloxyUrea Siloxane (5K | 3M |

-continued $$\sigma = g/H \left( \frac{[I_c R_c]}{I_s} - R_s \right).$$

Table of Components

| Component | Source |
|---|---|
| MAUS) Alipal EP-110 30% solids of ammonium salt of sulfated alkylphenoxy | Rhone-Poulenc, Cranbury, NJ |
| $Bu_4N\ C(SO_2CF_3)_3$ | See generally WO95/03338 (Lamanna et al.) |
| CGI 1700 photoinitiator | Ciba-Geigy Corporation, Ardsley, N.Y. |
| Darocur ™ 1173 | Ciba-Geigy Corporation, Ardsley, NY |
| DMDO (1,8-dimercapto-3,6-dioxo-octane) | Nisso Murazen Chemical, Tokyo, Japan |
| DVE-3 3,6,9,12-tetraoxatetradeca-1,13-diene | GAF ISP Technologies, Wayne, N.J. |
| Ebecryl ™ 230 (a urethanediacrylate) | Radcure Specialties, Inc., Atlanta, GA |
| FOA ($C_7F_{15}CH_2OC=OCH=CH_2$) | FC-5165, 3M Company, St. Paul, MN |
| glycidylmethacrylate | Aldrich Chemical Co., Milwaukee, WI |
| HQ-115 Fluorad brand lithium (bis)trifluoromethanesulfonamide | 3M Company, St. Paul, MN |
| isooctyl acrylate (IOA) | SR 440, Sartomer Company, West Chester, PA |
| lithium-4-pentafluoroethyl perfluorocyclohexane sulfonate | FC98, 3M Company, St. Paul, MN (potassium salt) converted to the lithium salt by ion exchange |
| $Li\ C(SO_2CF_3)_3$ | U.S. Pat. No. 5,554,664 (Lamanna et al.) |
| methyl (tricaprylyl) ammonium bromide (Aliquat ™ 336) | Henkel Corporation, Kankakee, IL |
| $Me_4NC(SO_2CF_3)_3$ | U.S. Pat. No. 5,554,664 (Lamanna et al.) |
| $NaBF_4$ | Aldrich Chemical Co., Milwaukee, WI |
| NaTFPB $Na^{\oplus\ominus}B\left(\underset{CF_3}{\overset{CF_3}{\bigcirc}}\right)_4$ | generally WO95/03338 (Lamanna et al.) |
| $NH_4BF_4$ | Aldrich Chemical Co., Milwaukee, WI |
| N,N-dimethyl acrylamide (NNDMA) | Jarchem Industries, Inc., Newark, NJ |

Synthesis of 5K MAUS

This free-radically curable polydimethylsiloxane (PDMS) is made according to the procedure outlined in EPO Appln. No 92.907947.3 (Mazurek et al.).

A 5,000 molecular weight α,ω-bis(3-aminopropyl) PDMS (EPO Appln No. 93.924905.8 (Leir et al.)) is reacted in bulk with 2-isocyanatoethyl methacrylate to yield 5K MAUS. Stepwise addition of the capping agent to the PDMS with some cooling is desirable to avoid polymerization of the free-radically curable PDMS product.

Objects and advantages of this invention are further illustrated by the following examples, but the particular materials and amounts thereof recited in these examples, as well as other conditions and details, should not be construed to unduly limit this invention.

EXAMPLE 1

A release coating composition was prepared by mixing at room temperature 100 parts of a 75/25 IOA/1,6-HDDA mixture, 25 pph 5K MAUS, and 2 pph Darocur™ 1173. The resistance was measured as described in Method II and found to be outside the instrument range. Then, 0.1 pph HQ-115 was added to the composition and at a height of H=4 cm, the resistance was 397 kΩ (37.4 μS/m conductivity). An additional 0.1 pph HQ-115 was added which lowered the resistance to 233 kΩ (63.8 μS/m conductivity).

This example demonstrates that at levels below 1 pph, the HQ-115 salt increases the UV curable composition's conductivity to a level within the range required for electrospray application.

EXAMPLE 2

The release coating composition of Example 1 was prepared substituting 2 pph VAZO 64 for the Darocur™ 1173 as initiator. When 0.1 pph HQ-115 was added to the composition, using Method II, at a height H=4 cm, the resistance was 331 kΩ (44.9 μS/m conductivity). When an additional 0.1 pph HQ-115 was added the resistance decreased to 206 kΩ (72.2 μS/m conductivity).

EXAMPLE 3

The release coating composition of Example 1 was prepared substituting 0.03 pph 2-ethyl-4-methyl-imidazole HTFPB for HQ-115 as the conductivity enhancer. Using Method II, at a height H=4 cm, the resistance measured 378 kΩ (39.3 μS/m conductivity).

Comparative Example A

This composition was prepared as described in Example 3 replacing imidazolium HTFPB with a lower cost conductivity enhancer, Aliquat™ 336, having an inorganic anion as the counterion for the onium cation. After the addition of 1.5 pph Aliquat 336, using Method II at a height H=4 cm, the resistance was about 3 MΩ (5 μS/m conductivity).

In compositions or applications where only minimal salt levels are tolerable, the use of the conductivity enhancers of this invention offer a benefit over quaternary ammonium salts with inorganic anions.

EXAMPLE 4

A UV curable urethane modified coating was prepared by mixing at room temperature 50 pph IOA, 30 pph 1,6-HDDA, 20 pph Ebecryl™ 230, and 2 pph Darocur 1173. Then, 0.1 pph HQ-115 was added. The composition was clear and electrosprayable with a resistance at height H=4 cm of 341 kΩ (43.6 μS/m conductivity) as determined by Method II.

EXAMPLE 5

An electrosprayable monomer mixture useful as a primer for copolymerized acid containing adhesives was prepared by mixing at room temperature 70 pph 1,6-HDDA, 30 pph glycidylmethacrylate, and 0.015 pph HQ-115. The primer composition was clear and had a Brookfield viscosity of about 5 centipoise. Using Method II at height H=4 cm, the resistance was 342 kΩ (43.5 μS/m conductivity).

EXAMPLE 6

A composition was prepared as described in Example 4 changing the monomer ratio to 60 pph 1,6-HDDA and 40 pph glycidylmethacrylate. The addition of 0.015 pph HQ-115 resulted in a clear composition having a Brookfield viscosity of about 7 centipoise. Using Method II at a height H=4 cm, the resistance was 264 kΩ (56.3 μS/m conductivity).

EXAMPLE 7

This example illustrates that the conductivity of the monomer solutions can easily be tailored to the desired level for the application of interest.

Eighty gram batches were prepared by mixing at room temperature 76.2 g of 75/25 monomer mixture of IOA/1,6-HDDA and 3.8 g of 5K MAUS. Then, different levels of HQ-115 were added to each 80 g batch. The following conductivities were measured using Method I.

| Sample | grams of HQ-115 | Conductivity (μS/m) |
|---|---|---|
| 1 | 0.024 | 4.56 |
| 2 | 0.049 | 5.37 |
| 3 | 0.096 | 6.88 |
| 4 | 0.19 | 14.6 |

EXAMPLE 8

A sample of Alipal EP-110 was oven dried to yield 100% solids material. The dry surfactant was used to decrease the resistance of a IOA monomer solution. Using Method II, at H=4 cm, a resistance of more than 10 MΩ was found for the pure IOA. The addition of 0.75 pph of the surfactant dropped the resistance to 2.0 MΩ (7.4 μS/m conductivity). An additional 0.25 pph surfactant was added and the resistance dropped to 939 kΩ (15.8 μS/m conductivity). Finally, with a total concentration of 2 pph surfactant in IOA, the resistance was about 81 kΩ (183 μS/m conductivity). This example demonstrates that surfactants can be used to enhance the conductivity of organic solutions.

EXAMPLE 9

A composition was prepared by mixing at room temperature 100 pph of a 75/25 IOA/1,6-HDDA monomer mixture and 0.02 parts per hundred HQ-115. Using Method II, the resistance measurement at a height H=4 cm was 4 MΩ (3.7 μS/m conductivity). The addition of 0.05 pph 1,10-phenanthroline decreased the resistance to 755 kΩ (19.2 μS/m conductivity). Thus, a polar additive such as 1,10-phenanthroline can enhance the dissociation of the lithium salt (conductivity enhancer) by complexing with the Li ion.

EXAMPLE 10

This example demonstrates the use of different conductivity enhancers to bring otherwise essentially non-conductive monomers into a conductivity range useful for electrospray application. Some samples also demonstrate the utility of optionally adding dissociation enhancing agents.

The samples were prepared by dissolving minimal amounts of the salts in the pure monomer. If the salt did not dissolve at room temperature, the monomer was then moderately heated. The samples were then allowed to stand at room temperature for about two hours and the solubility was evaluated. Samples that had insolubles (particulates) were discarded. Once the salt was determined to be soluble, the conductivity was obtained using Method III by measuring the current in microamperes (μA). The results are listed in the table below:

TABLE

Examples for free-radical curing e-spray

| Sample | Conductivity Enhancer | Concentration (pph) | Monomer | Dissociation Enhancing Agent (pph) | Soluble | Current (μA) at H = 5 cm | Conductivity (μS/M) |
|---|---|---|---|---|---|---|---|
| 1 | none | | IOA | | | 0 | N/A |
| 2 | NaBF$_4$ | 0.07 | IOA | none | no | 0 | N/A |

TABLE-continued

Examples for free-radical curing e-spray

| Sample | Conductivity Enhancer | Concentration (pph) | Monomer | Dissociation Enhancing Agent (pph) | Soluble | Current ($\mu$A) at H = 5 cm | Conductivity ($\mu$S/M) |
|---|---|---|---|---|---|---|---|
| 3 | NH$_4$BF$_4$ | 0.07 | IOA | none | no | 0 | N/A |
| 4 | 2-Et-4-Me-imidazole-H TFPB | 0.02 | IOA | none | yes | 7.4 | 46.9 |
| 5 | 2-Et-4-Me-imidazole-H TFPB | 0.03 | FOA | none | yes | 4.0 | 9 |
| 6 | Me$_4$NC(SO$_2$CF$_3$)$_3$ | 0.03 | IOA | none | yes | 0.2 | 0.26 |
| 7 | lithium 4-pentafluoroethyl-perfluorocyclohexane sulfonate | 0.10 | IOA | none | yes | 0.2 | 0.26 |
| 8 | NaTFPB | 0.05 | IOA | none | yes | 7.7 | 58.1 |
| 9 | NaTFPB | 0.03 | FOA | none | yes | 3.8 | 8.2 |
| 10 | Bu$_4$NC(SO$_2$CF$_3$)$_3$ | 0.05 | IOA | none | yes | 2.6 | 4.6 |
| 11 | LiN(SO$_2$CF$_3$)$_2$ | 0.06 | IOA | none | yes | 1.2 | 1.8 |
| 12 | LiN(SO$_2$CF$_3$)$_2$ | 0.03 | FOA | none | yes | 0.2 | 0.26 |
| 13 | LiC(SO$_2$CF$_3$)$_3$ | 0.06 | IOA | none | yes | 4.0 | 9 |
| 14 | LiC(SO$_2$CF$_3$)$_3$ | 0.03 | FOA | none | yes | 0.5 | 0.68 |
| 15 | none | | FOA | none | | 0 | N/A |
| 16 | Bu$_4$NC(SO$_2$CF$_3$)$_3$ | 0.05 | IOA | 1 pph NNDMA | yes | 3.6 | 7.5 |
| 17 | LiC(SO$_2$CF$_3$)$_3$ | 0.06 | IOA | 1 pph 12-crown-4 | yes | 4.8 | 12.7 |
| 18 | LiC(SO$_2$CF$_3$)$_3$ | 0.03 | FOA | 1 pph 12-crown-4 | yes | 2.1 | 3.5 |
| 19 | LiC(SO$_2$CF$_3$)$_3$ | 0.03 | FOA | 1 pph NNDMA | yes | 3.5 | 7.2 |

As indicated, the pure monomers are non-conductive, but upon addition of small amounts of the salts of the present invention the conductivity increases. For some samples the conductivity was in the useful range for electrospray even for the very low concentrations used. More conventional salts, such as NaBF$_4$ or NH$_4$BF$_4$, did not dissolve in these monomers, and therefore, did not enhance the ionic conductivity of the acrylate monomer solutions. Some of the salts which were not as effective as conductivity enhancers can be used at a higher concentration or dissociation enhancing agents can be added to increase the concentration of free ions. The IOA and FOA monomers represent the least polar acrylate monomers. The use of more polar acrylate monomers will likely only enhance the solubility of the salts, and therefore, increase their conductivity enhancing properties.

This example also demonstrates that dissociation enhancing agents, such as a polar monomer (e.g., NNDMA) or an alkali ion complexing crown ether may be used to increase the free ion concentration and the conductivity of the solutions.

EXAMPLE 11

This example demonstrates the use of the salts in ene-thiol curing polymers. A masterbatch monomer mixture was prepared by mixing at room temperature 91.15 g DMDO and 101.13 g DVE-3. Using Method III, the measured current was 0.1 $\mu$A (0.16 $\mu$S/m conductivity) at height H=4 cm.

(a) To the masterbatch, 0.044 pph tetrabutylammonium fluoroborate was added and the current increased to 4.0 $\mu$A (11.2 $\mu$S/m conductivity).

(b) To the masterbatch, 0.048 pph Li C(SO$_2$CF$_3$)$_3$ was added and the current increased to 1.0 $\mu$A (1.8 $\mu$S/m conductivity).

EXAMPLE 12

An adhesive composition was prepared by mixing at room temperature 80 g acrylic monomers (made by adding 10 wt % acrylic acid to a 75/25 IOA/1,6-HDDA monomer mixture), 0.16 g CGI 1700 photoinitiator, and 0.12 g LiN (SO$_2$CF$_3$)$_2$ as a conductivity enhancer. The composition was electrosprayed using a web speed of 30 fpm (9.14 m/min.) onto a sheet of poly(methyl methacrylate) (PMMA) using a process similar to that disclosed in U.S. Pat. No. 5,326,598 (Seaver et al.) incorporated by reference herein, and U.S. Ser. No. 08/392,108 (Seaver et al.)

About 0.3 liters of the release coating composition was placed in a small glass jar and drawn out by a pump (Masterflex™ pump drive Model 7520-25, Micropump™ Model 07002-26 pump head, both available from Cole-Parmer Instrument Co., Chicago, Ill.) to the sprayhead.

The electrospray coating head die consisted of two plastic die halves which when placed together maintained a 0.508 mm exit slot along the bottom of the die. Recessed in the slot and compressed to 1.53 mm was a Porex Model X-4920 porous plastic sheet (Porex Technologies, Fairburn, Ga.) to maintain a reasonable pressure drop and allow uniform flow. A wire was suspended beneath the slot and extractor rods suspended parallel to the wire in approximately the same horizontal plane. The slot had a width of 0.318 m and the die end caps added another 0.0127 m, creating a 0.33 m segment of the wire wetted by the coating solution. This 0.33 m width was used in a mass balance equation to calculate the flow rate required to obtain a desired coat height at any defined web speed. The wire had a diameter of 1.59 mm and was positioned 0.889 mm from the slot. The extractor rods each had a diameter of 6.35 mm and were positioned on either side of the wire 11.1 mm above the wire and 0.12 m above the earth grounded metal coating drum (0.508 m diameter and 0.61 m width).

The PMMA sheet was attached to 36 µm thick polyester carrier web (available from 3M) by box sealing tape available from 3M. The web speed was held fixed at the rates listed below for each corresponding sample and the pump was adjusted to produce the listed coat height, or coating thickness.

During coating the web was charged on the coating drum using a corotron consisting of a half-moon-shaped earth-grounded conductor made from a 72 mm diameter ID aluminum pipe and a 60 micrometer diameter wire attached to a positive power supply (Model PS/WG-10P30-DM, available from Glassman High Voltage, Inc., Whitehouse Station, N.J.)). The corotron voltage was adjusted to always charge the polyester carrier web to a 1000 volt potential relative to the grounded coating drum.

A negative 30 kV Glassman power supply Model PS/WG-50N6-DM (Glassman High Voltage, Inc.) was connected to the sprayhead wire. The extractor electrodes were held at ground potential.

When a coating flow was present and the high voltage was applied, liquid filaments formed over the wetted 0.33 m length of the wire beneath the slot. The Rayleigh jet caused a breakup of the filaments creating a mist of negatively charged droplets which were attracted to the positively charged carrier web.

Subsequent to coating, a second sheet of PMMA was placed over the adhesive coated side of the first sheet and the two-sheet "sandwich" was exposed to a high intensity UV light to polymerize. The UV processor (available from GEO AETEK International, Plainfield, Ill.) consisted of two medium pressure mercury vapor UV lights within a gas purging chamber which was inerted with nitrogen gas. These lights were set to power setting of 125 W/in (4.9 kW/m). The two sheets strongly adhered to each other.

EXAMPLE 13

A composition was prepared by mixing at room temperature 100 g IOA/AA (90/10 monomer ratio) containing 12 parts Ebecryl 230, 0.025 parts HQ-115 and 2 parts Darocur 1173 was electrosprayed as described in Example 12, to a coating thickness of 4 micrometers on a 1.5 mil (38.1 micrometer) polyester liner. The composition was coated at a speed of 25 fpm (14.1 m/min) and cured using one high intensity UV lamp set at a power of 200 Watts/inch (7.87 kW/m). The total curing energy is about 124 mJ/cm². The cured composition provided a 4 micrometer thick pressure-sensitive adhesive.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A free-radically polymerizable composition comprising:
   a) one or more free-radically polymerizable monomer(s);
   b) one or more non-volatile conductivity enhancer(s) having cationic and anionic portions, which are soluble in said monomer(s) and which do not interfere with polymerization, wherein the anionic portion is a non-coordinating organophilic carbon-containing anion;
   wherein said composition may be coated onto a substrate by means of electrostatic assistance.

2. The composition according to claim 1 wherein said composition is solvent-free.

3. The composition according to claim 1 wherein said monomer(s) is selected from the group consisting of ethylenically unsaturated compounds, ethylenically unsaturated compounds in combination with multifunctional thiol compounds or polyamines, and mixtures thereof.

4. The composition according to claim 3 wherein said ethylenically unsaturated compounds are selected from the group consisting of acrylates, methacrylates, vinyl esters, methacrylamides, acrylamides, fumarates, styrenes, maleimides, and mixtures thereof.

5. The composition according to claim 3 wherein said multifunctional thiol compound is selected from the group consisting of α-mercaptoglycolates, β-mercaptopropionates, mercaptoalkyl functional polydiorganosiloxanes, and mixtures thereof.

6. The composition according to claim 1 wherein said noncoordinating organophilic carbon-containing anion has a formula weight of at least 200 kg/kmol.

7. The composition according to claim 1 wherein said conductivity enhancer concentration ranges from about 0.001 percent by weight to about 10 percent by weight.

8. The composition according to claim 1 wherein said noncoordinating organophilic carbon-containing anion is selected from the group consisting of alkyl-, cycloalkyl- and arylsulfonates, fluoroalkylsulfonylimides, fluoroalkylsulfonylmethides, arylborates, carboranes, metallocarboranes, and boron catecholates.

9. The composition according to claim 1 wherein said noncoordinating organophilic carbon-containing anion is fluorinated.

10. The composition according to claim 1 wherein said noncoordinating organophilic carbon-containing anion has one of the following formulae:

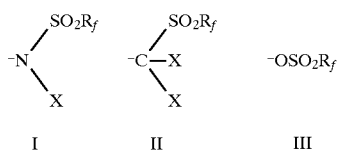

wherein:
   X is selected from the groups: H, alkyl, alkenyl, aryl, alkaryl, —SO$_2$R, —SO$_2$R$_f$, —SO$_2$F, —C(O)R, and —C(O)R$_f$;
   R is selected from the groups: alkyl, cycloalkyl, aralkyl, substituted alkyl groups, aryl, and substituted aryl; and
   R$_f$ is a monovalent fluorinated saturated aliphatic radical containing at least one carbon atom.

11. The composition according to claim 10 wherein R$_f$ is a perfluoroalkyl or perfluorocycloalkyl group.

12. The composition according to claim 10 wherein X is a —SO$_2$R$_f$ group and R$_f$ is a perfluoralkyl or perfluorocycloalkyl group.

13. The composition according to claim 10 wherein said noncoordinating organophilic carbon-containing anion is an imide or methide anion of formula (I) or (II).

14. The composition according to claim 1 wherein said noncoordinating organophilic carbon-containing anion has the formula:

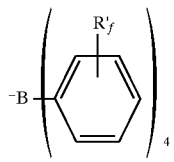

IV wherein R$_f'$ is one or more fluorinated substituent(s) per aromatic ring and is selected from the group consisting of one or more fluorine atoms or monovalent fluorinated saturated aliphatic radicals containing at least one carbon atom.

15. The composition according to claim 14 wherein the total number of non-ring carbon atoms in the fluorinated substitutent(s) R$_f'$ is collectively no greater than 4 per aromatic ring.

16. The composition according to claim 14 wherein said noncoordinating organophilic carbon-containing anion is selected from the group consisting of tetrakis[pentafluorophenyl]borate and tetrakis[3,5-bis-trifluoromethylphenyl]borate.

17. The composition according to claim 1 wherein the cationic portion of the conductivity enhancer is selected from the group consisting of alkali or alkaline earth metal cations or group Va, VIa, or VIIa onium ions.

18. The composition according to claim 1 further comprising at least 0.1 percent by weight of one or more dissociation enhancing agent(s).

19. The composition according to claim 18 wherein said dissociation agent(s) are selected from the group consisting of N,N-dimethyl acrylamide, crown ethers, polyethylene glycol, kryptands, poly(ethylene oxides), N-vinyl pyrrolidinone, methacrylic acid, 2-ethoxy ethylacrylate, and polyethyleneglycol-acrylate monomer.

20. The composition according to claim 18 wherein said dissociation enhancing agent(s) have a dielectric constant of at least 5 at 20° C.

21. The composition according to claim 1 further comprising one or more free radical initiator(s).

22. The composition according to claim 21 wherein said initiator is selected from the group consisting of benzoin ethers, acetophenone derivatives, benzophenone, anthraquinone, 4,4'-bis(dimethylamino)benzophenone, benzoylperoxide, 2,2'-azo-bis(isobutyronitrile), 1,1'-azo-bis(cyclohexane-1-carbonitrile), dicumylperoxide, amines with peroxides, cobaltous carboxylate salts with peroxides, and persulfate/bisulfite redox pairs.

23. The composition according to claim 21 wherein said initiator concentration ranges from about 0.1 percent by weight to about 3 percent by weight.

24. The composition according to claim 1 further comprising cross-linking agents.

25. The composition according to claim 24 wherein said cross-linking agent is selected from the group consisting of multifunctional acrylates, multifunctional allyl compounds, photoactive triazines, copolymerizable benzophenone compounds, melamines, divinyl benzene, divinyl silane compounds, bis-vinyl ethers, bis-vinyl esters, vinyl functional trialkoxysilanes, and vinyl functional ketoximinosilanes.

26. The composition according to claim 1 wherein viscosity measures from about $10^{-3}$ Pa·s to about 10 Pa·s.

27. The composition according to claim 1 wherein viscosity measures from about $10^{-3}$ Pa·s to about 2 Pa·s.

28. The composition according to claim 1 wherein viscosity measures from about $10^{-3}$ Pa·s to about 1 Pa·s.

29. The composition according to claim 1 wherein conductivity ranges from about $10^{-7}$ S/m to about $10^{-1}$ S/m.

30. The composition according to claim 1 wherein conductivity ranges from about $10^{-5}$ S/m to about $10^{-1}$ S/m.

31. The composition according to claim 1 wherein conductivity ranges from about $10^{-5}$ S/m to about $10^{-4}$ S/m.

32. The composition according to claim 1 wherein said composition is applied to a substrate by electrospray.

33. The composition according to claim 1 wherein said composition is applied to a substrate by electrostatic spray.

34. The composition according to claim 1 wherein said composition is applied to a substrate by electrostatically assisted continuous liquid coating.

35. The composition according to claim 34 wherein said continuous liquid coating is selected from roll, curtain, slot, slide and gravure coating.

36. A method of applying a composition comprising one or more free-radically polymerizable monomer(s) and optionally one or more initiator(s), being such that when in combination they have a conductivity insufficient to be applied by electrostatic assistance methods, said method comprising the steps of (a) adding one or more non-volatile conductivity enhancer(s) having cationic and anion portions wherein the anionic portion is a non-coordinating organophilic carbon-containing anion, which are soluble in said monomer(s) and which do not interfere with polymerization and optionally one or more dissociation enhancing agent(s) to said composition yielding an application composition;

(b) applying said application composition to a substrate by means of electrostatic assistance; and then (c) polymerizing said application composition.

37. The method according to claim 36 wherein said substrate is selected from the group consisting of poly(propylene), poly(ethylene), poly(vinyl chloride), poly(tetrafluoroethylene), polyester, polyimide film, cellulose acetate, ethyl cellulose, woven fabric, nonwoven fabric, paper, cotton, nylon, rayon, glass, metal, metallized polymeric film, ceramic sheet material, abrasives, natural or synthetic rubber, and pavement marking tapes.

38. A substrate comprising:

a) a backing having first and second sides;

b) an adhesive layer having two sides, one side coated to the first side of said backing; and c) a release layer on the second side of said backing comprising a polymerized coating obtained by electrostatic assistance application of the composition according to claim 1 onto the second side of said backing and polymerizing the composition subsequent to said electrostatic assistance application.

39. The substrate according to claim 38 wherein said substrate is selected from the group consisting of poly(propylene), poly(ethylene), poly(vinyl chloride), poly(tetrafluoroethylene), polyester, polyimide film, cellulose acetate, ethyl cellulose, woven fabric, nonwoven fabric, paper, cotton, nylon, rayon, glass, metal, metallized polymeric film, ceramic sheet material, abrasives, natural or synthetic rubber, and pavement marking tapes.

40. The substrate according to claim 38 wherein said substrate is rolled such that the adhesive layer contacts the release layer.

41. A substrate having two major surfaces wherein the composition according to claim 1 is electrosprayed on at least a portion of at least one major surface.

42. The substrate according to claim 41 wherein said composition is polymerized subsequent to said electrospray application.

43. The substrate according to claim 41 wherein said composition is electro-sprayed onto the second side of said backing.

44. The composition according to claim 1 wherein said composition is a primer, a thin adhesive, an anti-fogging coating, an ice-release coating, an anti-graffiti coating, an abrasion-resistant coating, a durable coating, a light-scattering coating, a stain-resistant coating, scuff-resistant coating, or a matte surface coating.

* * * * *